United States Patent
Sorgenfrei

(10) Patent No.: US 6,352,304 B1
(45) Date of Patent: Mar. 5, 2002

(54) DEVICE FOR INDICATING AN AIRBAG MODULE POSITION

(75) Inventor: Allen R. Sorgenfrei, Livonia, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/377,804

(22) Filed: Aug. 19, 1999

(51) Int. Cl.[7] ................................................. B60N 2/42
(52) U.S. Cl. ................................ 297/216.13; 280/730.2
(58) Field of Search ........................... 280/728.1, 730.1, 280/730.2; 297/216.1, 216.13, 331, 326; 296/65.01, 65.05; 29/428

(56) References Cited

U.S. PATENT DOCUMENTS

| | | | |
|---|---|---|---|
| 5,860,673 A | * | 1/1999 | Hasegawa et al. |
| 5,893,579 A | * | 4/1999 | Kimura et al. |
| 5,906,390 A | * | 5/1999 | Phillion et al. |
| 5,967,603 A | * | 10/1999 | Genders et al. |
| 5,975,567 A | * | 11/1999 | Higashiura |
| 6,095,602 A | * | 8/2000 | Umezawa et al. |

* cited by examiner

Primary Examiner—Milton Nelson, Jr.
(74) Attorney, Agent, or Firm—Foley & Lardner

(57) ABSTRACT

A device for providing a visual indication of the installation position of an airbag module mounted to a structural member within a trim cover. The device includes a cavity liner connected to the trim cover for directing the force of the inflatable airbag in a direction towards a rupturable seam of the trim cover, and a contoured member connected to the cavity liner. The contoured member is congruent to a first portion of the airbag module and is incongruent to a second portion of the airbag module, such that the contoured member provides a visual indication of the installation position of the airbag module relative to the cavity liner from a vantage facing the exterior of the trim cover.

17 Claims, 3 Drawing Sheets

DEVICE FOR INDICATING AN AIRBAG MODULE POSITION

FIELD OF THE INVENTION

The invention relates generally to an assembly for housing an airbag module and, more particularly, to a device for providing a visual indication of the installation position of an airbag module.

BACKGROUND FOR THE INVENTION

In recent years, automobile manufacturers have directed an increasing amount of attention towards providing side impact protection for vehicle passengers. One of the viable methods includes providing an inflatable airbag mounted to the seat back frame of a passenger seat. Seat mounted side impact inflatable airbags (SIAB) fall into two general categories. The first type of seat mounted SIABs deploys from a visible, discrete door on the outboard side of the seat back or seat cushion bolster. The other type of seat mounted SIABs is stowed beneath the seat trim and is designed to deploy through the trim cover.

In some respects, the first type has an advantage in that the technology for the deployment of an airbag through a discrete door has been already developed for frontal airbags in steering wheels and instrument panels. The first type has the disadvantage, however, in that the location of the SIAB is generally limited to the side of the seat so that the visible door is not a part of the seating surface engaged by a seat occupant. If it is desired for the airbag to deploy through the front corner of the seat back, such as the location of a bolster seam, the first type of seat mounted SIABs cannot be used. Rather, the second type of seat mounted SIABs must be used, typically under the trim cover and the foamed padding such that the airbag does not adversely affect the seat comfort.

One of the recent developments for the second type of seat mounted side impact airbags includes the use of a cavity liner for directing the force of the airbag in a direction towards a particular seam of the trim cover. In the conventional use of a cavity liner, the airbag module is inserted through an opening in the cavity liner and then fastened to the seat back frame. The airbag module may be fastened, however, directly to the seat back frame without prior placement of the airbag module within the cavity liner. Since the trim cover of the passenger seat is secured over the airbag module, whether located within the cavity liner or not, the installation position of the airbag module cannot be determined from the exterior of the passenger seat once the trim cover has been closed. Thus, a need exists in the art to provide a device for providing a visual indication of the installation position of an airbag module after the trim cover has been closed.

SUMMARY OF THE INVENTION

Accordingly, this invention provides for a device and for a seat assembly that provides a visual indication if the airbag module is mounted to the structural member without prior placement of the airbag module within the cavity liner. The invention also provides for a device that prevents the closure of the trim cover when the airbag module is mounted to the seat frame without prior placement of the airbag module within the cavity liner. The invention further provides for a device that causes a visible protrusion in a portion of the trim cover when the airbag module is mounted to the seat frame without prior placement of the airbag module within the cavity liner.

Briefly, the invention includes a device for providing a visual indication of the installation position of an airbag module mounted to a structural member within a trim cover. The device includes a cavity liner connected to the trim cover for directing the force of the inflatable airbag in a direction towards a rupturable seam of the trim cover, and a contoured member connected to the cavity liner. The contoured member is congruent to a first portion of the airbag module and is incongruent to a second portion of the airbag module, such that the contoured member provides a visual indication of the installation position of the airbag module relative to the cavity liner from a vantage facing the exterior of the trim cover.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
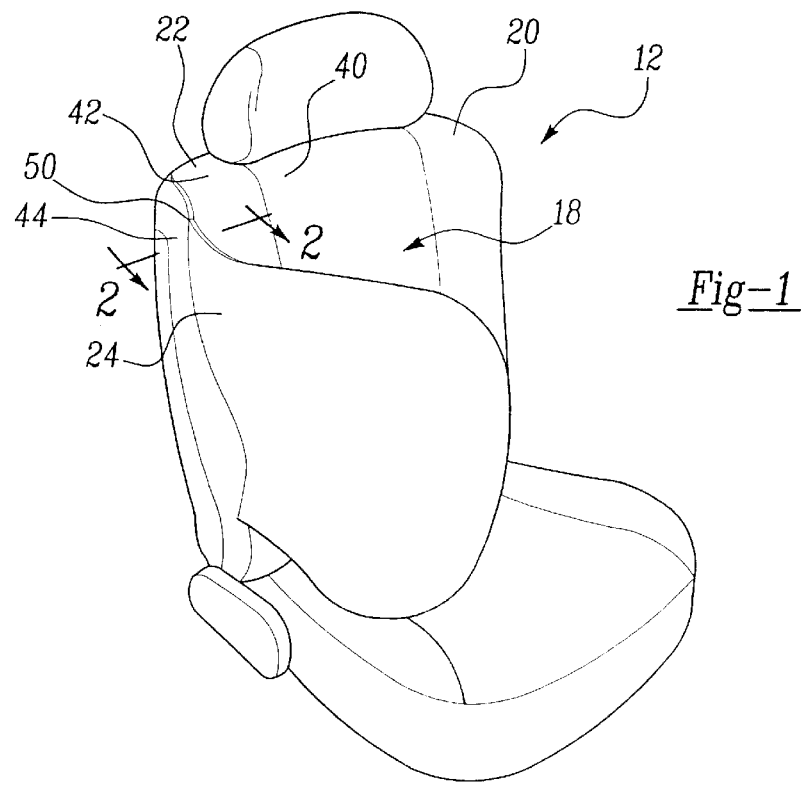
FIG. 1 is a perspective view of a seat assembly according to a preferred embodiments of the invention.
Figure 2:
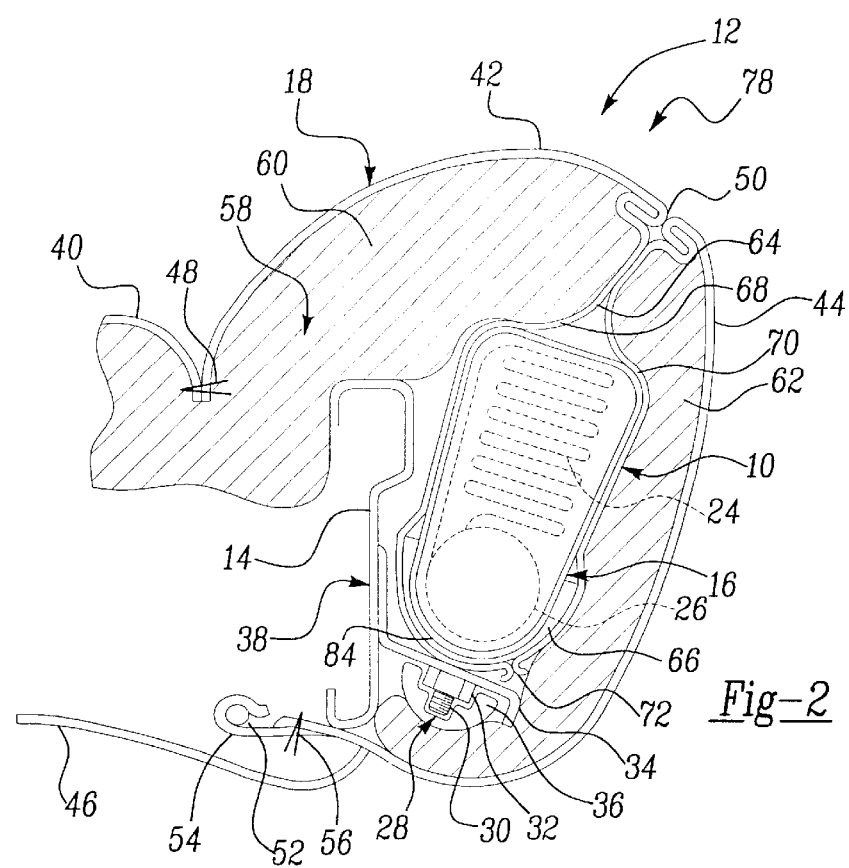
FIG. 2 is a cross-sectional view of the seat assembly according to a first preferred embodiment of the invention, taken along the line 2—2 in FIG. 1.
Figure 3:
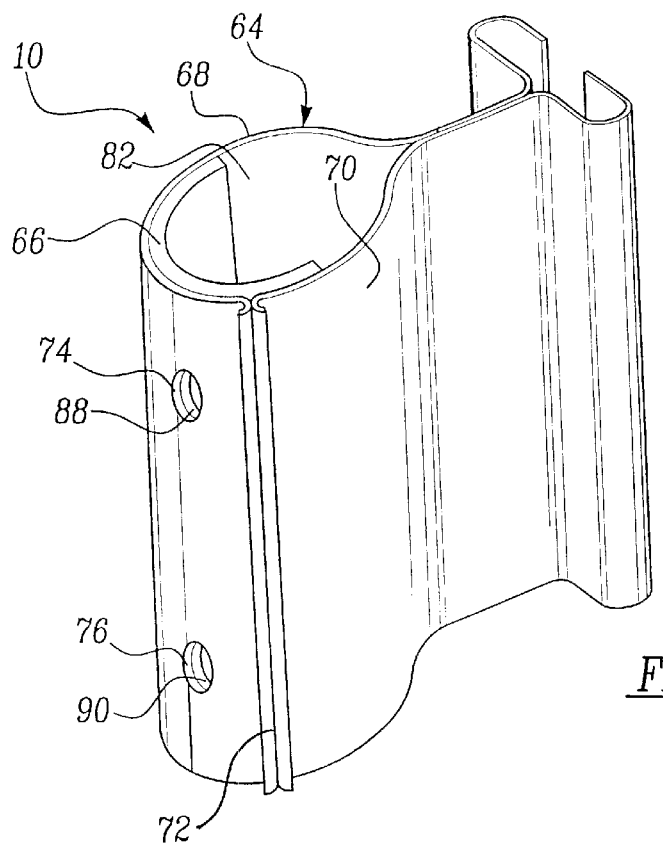
FIG. 3 is a perspective view of a device according to the first embodiment of the invention.

As shown FIGS. 1–3, the device 10 of the invention may be used as an element of a seat assembly 12. The device 10, of course, can be used in other assemblies of a vehicle, such as in a headliner, a roof pillar, an instrument panel, a steering wheel, and a door panel. Because the device 10 has particular advantages as an element of the seat assembly 12, the following detailed description will focus on the use of the device 10 as an element of the seat assembly 12.

The seat assembly 12 of the invention includes a seat frame 14, an airbag module 16, a trim cover 18, and the device 10 of the invention. Although shown as a so-called "bucket seat" with a left side bolster 20 and a right side bolster 22, the seat assembly 12 may be formed without the side bolsters 20 and 22, or as a "bench seat" arranged for two or more passengers. The seat frame 14 of the seat assembly 12 functions to support a passenger (not shown) and to support the airbag module 16. The seat frame 14 is made from conventional materials, such as steel, aluminum, or composite materials.

As shown in FIG. 2, the airbag module 16 includes an inflatable airbag 24 and an inflator 26. The airbag module 16 functions to reduce the severity of a vehicular impact by quickly deploying the inflatable airbag 24 (as best shown in FIG. 1) between the passenger of the vehicle and any surfaces of the vehicle. A first fastener 28, such as a bolt 30 and nut 32, mounts the airbag module 16 to a bracket 34, and a fastener cap 36 fits over the bolt 30. As a person of ordinary skill in the art would appreciate, other suitable fasteners can be used to mount the airbag module 16 to the bracket 34. The bracket 34 is spot welded to the seat frame 14 or, alternatively, attached by other suitable fasteners. The bracket 34 and the seat frame 14 cooperate to form a structural member 38 for the mounting of the airbag module 16. In other applications, the airbag module 16 may be mounted directly to the seat frame 14, or may be mounted to a headliner, a roof pillar, an instrument panel, a steering wheel, or a door panel. The first fastener 28 and the bracket 34 are made from conventional materials, such as steel, aluminum, or composite materials. The airbag module 16 is a conventional airbag module. Conventional airbag modules are known and used in the art of inflatable airbag systems, and its implementation into the seat assembly 12 of the invention would be readily understood by a person of ordinary skill in the art.

The trim cover 18 functions to cover the seat frame 14 and the airbag module 16 and to provide a comfortable and durable surface for the passenger. The trim cover 18 includes a front center portion 40, a front bolster portion 42, a rear bolster portion 44, and a rear center portion 46. The front center portion 40 and the front bolster portion 42 are secured together by a first seam 48. A rupturable seam 50, securing the front center portion 40 to the front bolster portion 42, allows for the deployment of the inflatable airbag 24 through the trim cover 18. The rear bolster portion 44 wraps around the airbag module 16 and attaches to a seat stay 52 of the seat frame 14 with a J-clip 54. The rear bolster portion 44 and the J-clip 54 are secured together by a second seam 56. The rear center portion 46, usually mounted to a rigid member (not shown), simply contacts the rear bolster portion 44. The trim cover 18 is made from conventional materials, such as leather, cloth, or vinyl. The seams are conventional stitches or, alternatively, may be other fasteners, such as adhesive, snaps, staples, VELCRO®, and DUAL-LOCK®.

A foamed padding 58 provides a cushioning layer between the trim cover 18 and the seat frame 14, and between the trim cover 18 and the airbag module 16. The foamed padding 58 includes a front portion 60, located under the front center portion 40 and the front bolster portion 42 of the trim cover 18, and a rear portion 62, located under the rear bolster portion 44 of the trim cover 18. The foamed padding 58 is made from conventional materials. Together with the trim cover 18 and the seat frame 14, the foamed padding 58 functions as a conventional passenger seat.

As shown in FIGS. 2 and 3, the device 10 of the invention includes a cavity liner 64 and a contoured member 66. The cavity liner 64 functions to direct the force of the inflatable airbag 24 in a direction towards the rupturable seam 50 of the trim cover 18 during inflation of the inflatable airbag 24, thereby directing deployment of the inflatable airbag 24 through the trim cover 18 at the rupturable seam 50. The cavity liner 64 includes a first liner section 68 and a second liner section 70. The first liner section 68 is secured to the front bolster portion 42 of the trim cover 18 at the rupturable seam 50, and the second liner section 70 is secured to the rear bolster portion 44 of the trim cover 18 at the rupturable seam 50. The first liner section 68 and the second liner section 70 are secured to each other at a rear seam 72. The first liner section 68 also includes a first aperture 74 and a second aperture 76, both for receiving the first fastener 28 and a second fastener (not shown) to mount the airbag module 16 to the structural member 38. The cavity liner 64 is made from a substantially non-elastic material such as 420 or 630 denier nylon airbag fabric, or from other suitable materials.

Figure 4:
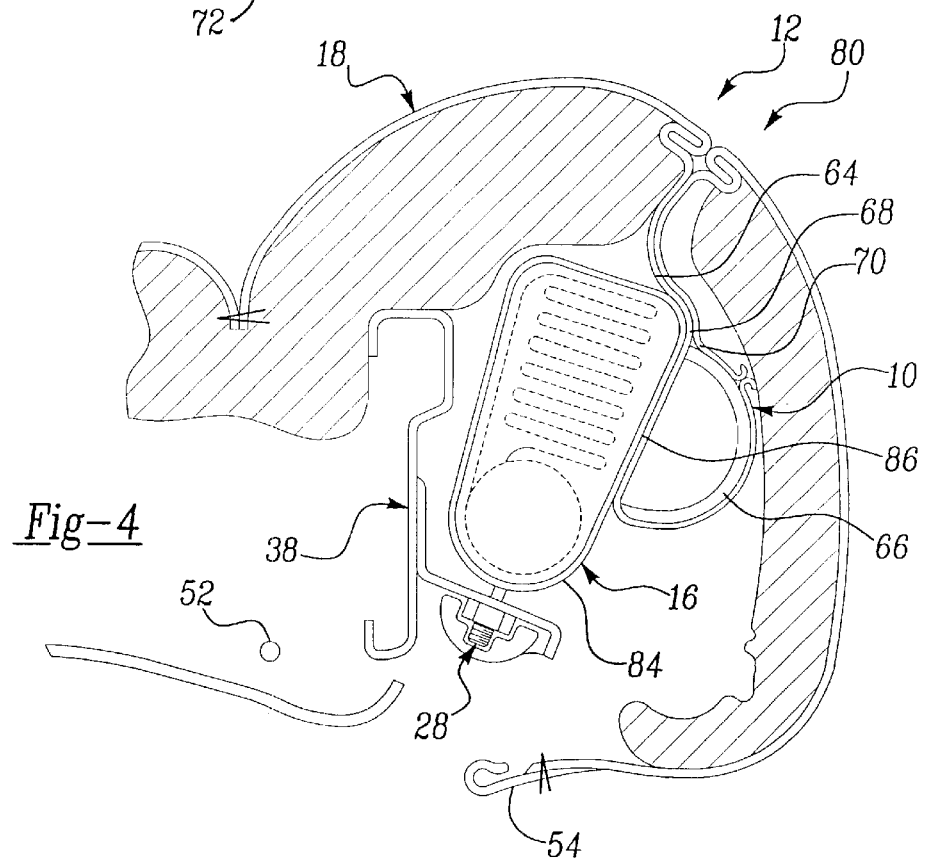
FIG. 4 is a cross-sectional view of the seat assembly of FIG. 2, shown with the airbag module in a second installation position.

During the assembly, the rupturable seam 50 is stitched thereby securing the liner sections 68 and 70 to the trim cover 18, and securing the front bolster portion 42 to the rear bolster portion 44. Then, the rear seam 72 is stitched thereby securing the first liner section 68 to the second liner section 70. At this point, the airbag module 16 is mounted to the structural member 38, either in a first installation position 78, as shown in FIG. 2, or in a second installation position 80, as shown in FIG. 4. To achieve the first installation position 78, the airbag module 16 is inserted through an opening 82 in the cavity liner 64 and the first fastener 28 and the second fastener (not shown) are inserted through the apertures 74 and 76 and secured to the structural member 38. To achieve the second installation position 80, the first fastener 28 and the second fastener (not shown) are secured directly to the structural member 38, without prior placement of the airbag module 16 within the cavity liner 64. After the mounting of the airbag module 16 to the structural member 38, the rear bolster portion 44 of the trim cover 18 is wrapped around the airbag module 16, and the J-clip 54 is fastened to the seat stay 52, thereby closing the seat assembly 12. Without using the device 10 of the invention, the installation position of the airbag module 16, whether located within the cavity liner 64 or not, cannot be determined from the exterior of the seat assembly 12 once the seat assembly 12 has been closed.

As shown in FIGS. 3 and 4, the contoured member 66 functions to provide a visual indication if the airbag module 16 is mounted in the second installation position 80. In other words, the contoured member 66 functions to provide a visual indication if the airbag module 16 is mounted to the structural member 38 without prior placement of the airbag module 16 within the cavity liner 64. The contoured member 66 is connected to the cavity liner 64 by a conventional stitch (not shown). Alternatively, the contoured member 66 may be connected to the cavity liner 64 by other fasteners, such as adhesives, snaps, staples, bolts, hooks, VELCRO®, and DUAL-LOCK®, or may be connected to the cavity liner 64 by a pocket, a channel, or a grommet through one or both of the apertures. Further, the contoured member 66 may be connected to the inside or outside of the first liner section 68, the inside or outside of the second liner section 70, the inside or outside of both liner sections 68 and 70, or between the liner sections 68 and 70. The contoured member 66 is congruent to a first portion 84 of the airbag module 16, and is incongruent to a second portion 86 of the airbag module 16. In other words, one side of the airbag module 16 fits into the contoured member 66, but another side does not. The contoured member 66 is substantially rigid, and is preferably formed from a plastic material. The contoured member 66 may be formed from other suitable materials such as metals or composites. The contoured member 66 includes a third aperture 88, which aligns with the first aperture 74 of the first liner section 68, and a fourth aperture 90, which aligns with the second aperture 76 of the first liner section 68. The apertures 88 and 90 receive the first fastener 28 and the second fastener (not shown) to mount the airbag module 16 to the structural member 38.

As shown in FIGS. 2 and 3, when using the device 10 of the invention, the first installation position 78 is achieved by inserting the airbag module 16 through the opening 82 in the cavity liner 64. Then, the first portion 84 of the airbag module 16 is nestled against the contoured member 66 and the first fastener 28 and the second fastener (not shown) are inserted through the apertures 88 and 90 of the contoured member 66 and the apertures 74 and 76 of the first liner section 68. After mounting of the airbag module 16 to the structural member 38, the rear bolster portion 44 of the trim cover 18 is wrapped around the airbag module 16, and the J-clip 54 is fastened to the seat stay 52, thereby closing the seat assembly 12. As shown in FIG. 4, the second installation position 80 is achieved by mounting the airbag module 16 to the structural member 38, without prior placement of the airbag module 16 within the cavity liner 64. When the trim cover 18 is attempted to be wrapped around the airbag module 16, the contoured member 66, which does not nestle with the second portion 86 of the airbag module 16, prevents the closure of the trim cover 18. Quite simply, the J-clip 54 cannot reach the seat stay 52, leaving a visible gap in the trim cover 18. When using the device 10 of the first preferred embodiment of the invention, the trim cover 18 can only be closed if the airbag module 16 is inserted within the cavity liner 64 and fitted into the contoured member 66. Thus, the device 10 provides a visual indication if the airbag module 16 is mounted in the second installation position 80.

Figure 5:
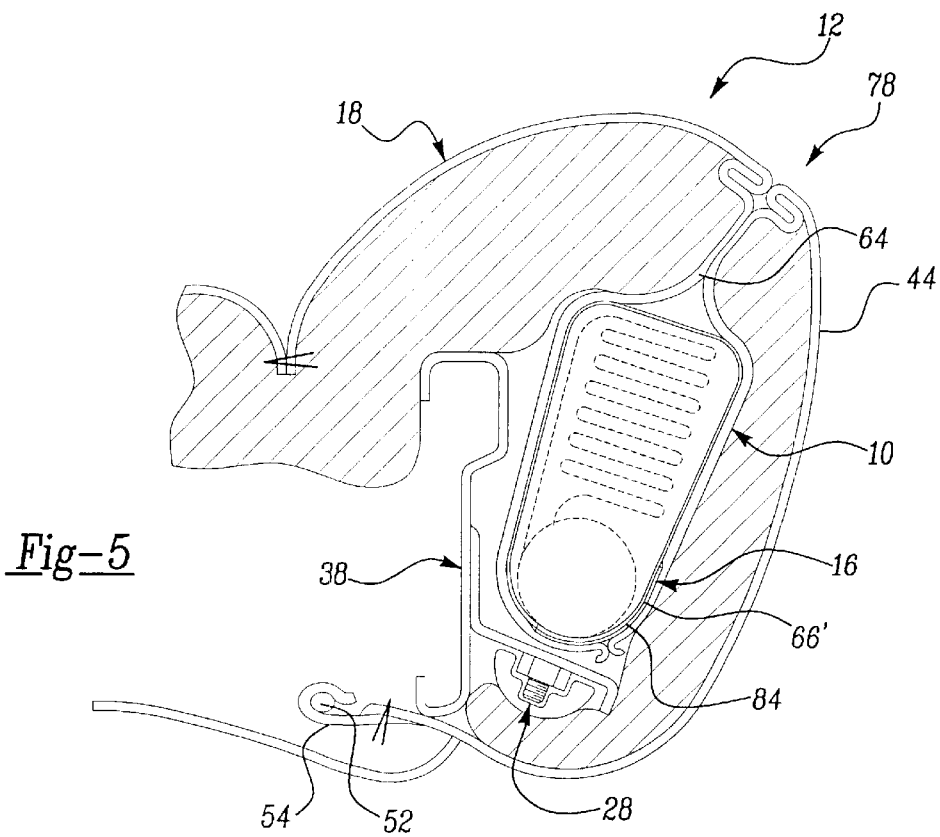
FIG. 5 is a cross-sectional view of the seat assembly, similar to FIG. 2, according to a second preferred embodiment of the invention.
Figure 6:
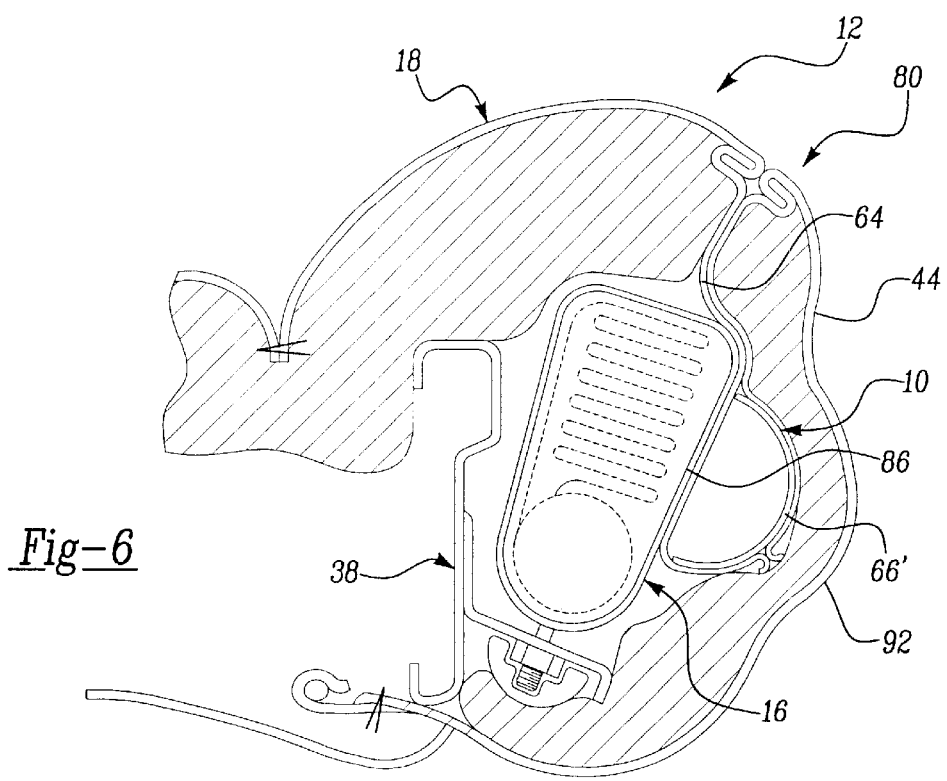
FIG. 6 is a cross-sectional view of the seat assembly of FIG. 5, shown with the airbag module in a second installation position.

As shown in FIG. 5, a contoured member 66' of the second preferred embodiment of the invention is smaller than the contoured member 66 of the first preferred embodiment (shown in FIG. 2). When using the device 10 of the second preferred embodiment of the invention, the first installation position 78 is achieved by inserting the airbag module 16 through the cavity liner 64, and nestling the first portion 84 of the airbag module 16 against the contoured member 66'. After the mounting of the airbag module 16 to the structural member 38, with the first fastener 28 and the second fastener (not shown), the rear bolster portion 44 of the trim cover 18 is wrapped around the airbag module 16, and the J-clip 54 is fastened to the seat stay 52, thereby closing the seat assembly 12. As shown in FIG. 6, the second installation position 80 is achieved by mounting the airbag module 16 to the structural member 38, without prior placement of the airbag module 16 within the cavity liner 64. When the trim cover 18 is wrapped around the airbag module 16, the contoured member 66', which does not nestle with the second portion 86 of the airbag module 16, causes a visible protrusion 92 in the rear bolster portion 44 of the trim cover 18. When using the device 10 of the second preferred embodiment of the invention, the seat assembly 12 can only be closed properly (without the visible protrusion 92) if the airbag module 16 is inserted within the cavity liner 64 and fitted into the contoured member 66'.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A seat assembly comprising:
a seat frame;
an airbag module including an inflatable airbag and being mounted to said seat frame;
a trim cover for covering said seat frame and said airbag module, said trim cover having a rupturable seam for allowing deployment of said inflatable airbag through said trim cover;
a cavity liner connected to said trim cover for directing the force of said inflatable airbag in a direction towards said rupturable seam of said trim cover during the inflation of said inflatable airbag; and
a contoured member connected to said cavity liner for providing a visual indication of the installation position of said airbag module relative to said cavity liner from a vantage facing the exterior of said seat assembly.

2. The seat assembly of claim 1, wherein said contoured member is congruent to a first portion of said airbag module and is incongruent to a second portion of said airbag module.

3. The seat assembly of claim 2, wherein said contoured member prevents the closure of said trim cover when said airbag module is mounted to said seat frame without prior placement of said airbag module within said cavity liner.

4. The seat assembly of claim 2, wherein said contoured member causes a visible protrusion in a portion of said trim cover when said airbag module is mounted to said seat frame without prior placement of said airbag module within said cavity liner.

5. The seat assembly of claim 1, wherein said contoured member is substantially rigid.

6. The seat assembly of claim 1, wherein said contoured member includes an aperture for receiving a fastener to mount said airbag module to said seat frame.

7. A device for use with an airbag module for providing a visual indication of a first installation position or a second installation position of the airbag module including an inflatable airbag and being mounted to a structural member within a trim cover having a rupturable seam for allowing deployment of the inflatable airbag through the trim cover, said device comprising:
a first means for directing the force of the inflatable airbag in a direction towards the rupturable seam of the trim cover during the inflation of the inflatable airbag; and
a second means, connected to the first means, for providing a visible indication of the first installation position or the second installation position of the airbag module relative to said first means from a vantage facing the exterior portion of the trim cover.

8. The device of claim 7, wherein said second means is congruent to a first portion of the airbag module and is incongruent to a second portion of the airbag module.

9. The device of claim 8, wherein said second means prevents the closure of the trim cover when the airbag module is mounted to the structural member without prior connection to said first means.

10. The device of claim 8, wherein said second means causes a visible protrusion in a portion of the trim cover when the airbag module is mounted to the structural member without prior connection to said first means.

11. The device of claim 7, wherein said second means is substantially rigid.

12. The device of claim 7, wherein said second means includes an aperture for receiving a fastener to mount the airbag module to the structural member.

13. A method for producing a seat assembly, comprising the steps of:
(a) providing a seat frame, an airbag module including an inflatable airbag, a trim cover having a rupturable seam for allowing deployment of the inflatable airbag through the trim cover, and a cavity liner for directing the force of the inflatable airbag in a direction towards the rupturable seam of the trim cover during the inflation of the inflatable airbag;
(b) connecting the cavity liner to the trim cover;
(c) mounting the airbag module to the seat frame; and
(d) providing a visual indication of the installation position of the airbag module relative to the cavity liner from a vantage facing the exterior of the seat assembly.

14. The method of claim 13, wherein step (d) includes providing a contoured member for providing a visual indication of the installation position of the airbag module relative to the cavity liner from a vantage facing the exterior of the seat assembly, and connecting the contoured member to the cavity liner.

15. The method of claim 14, wherein step (d) includes providing a contoured member that is congruent to a first portion of the airbag module and is incongruent to a second portion of the airbag module.

16. The seat assembly of claim 15, wherein step (d) includes preventing the closure of the trim cover if the airbag module is mounted to the seat frame without prior placement of the airbag module within the cavity liner.

17. The seat assembly of claim 15, wherein step (d) includes causing a visible protrusion in a portion of the trim cover if the airbag module is mounted to the seat frame without prior placement of the airbag module within the cavity liner.

* * * * *